April 12, 1932.          H. D. PAXTON           1,853,878
                      GLASS ANNEALING LEER
                      Filed March 8, 1930
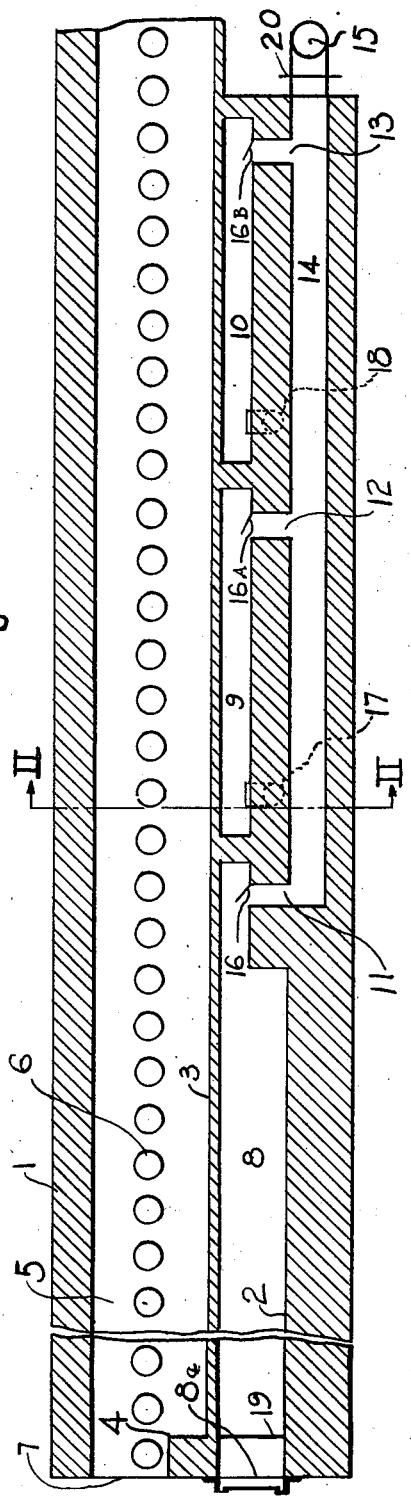
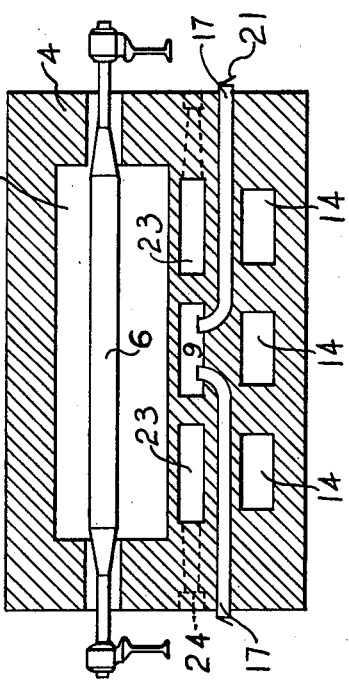
Henry D. Paxton
By William B. Jasper
Attorney.

Patented Apr. 12, 1932

1,853,878

UNITED STATES PATENT OFFICE

HENRY D. PAXTON, OF WASHINGTON, PENNSYLVANIA, ASSIGNOR TO HIGHLAND-WESTERN GLASS COMPANY, OF WASHINGTON, PENNSYLVANIA, A CORPORATION OF DELAWARE

GLASS ANNEALING LEER

Application filed March 8, 1930. Serial No. 434,312.

This invention relates to glass annealing leers and is especially adapted for the annealing of sheet glass, although it may be effectively utilized in the annealing of other forms of glassware.

It is among the objects of this invention to provide a leer structure of the muffle type in which the rate of heat losses by radiation from the glass and its supporting rollers to the muffles comprising the various flue sections, may be regulated both longitudinally and transversely of the structure. To this end the muffled flues are disposed in spaced relation both longitudinally and transversely and are of such lengths and widths relative to the length and width of the leer that by individual cooling or heating of said flues they may be caused to exercise a positive and localized control of the rate of heat radiation from the glass and rollers to the surface of the leer hearth adjacent the muffled flues, both longitudinally and transversely of the hearth surface.

In the accompanying drawings constituting a part hereof, and in which like reference characters designate like parts, Fig. 1 is a longitudinal sectional view of a glass annealing leer embodying the principles of this invention, and Fig. 2 is a cross sectional view thereof taken along the line II—II of Fig. 1.

In the drawings, 1 designates the roof or top wall of the leer; 2 the bottom wall; 3 an intervening wall of relatively thin cross sectional area which cooperates with the side walls 4, and roof 1 to form the muffled chamber 5.

Journalled within the side walls or projecting therethrough are a series of rollers 6 for supporting and moving the sheet glass from the charging to the discharge end of the leer, the passage 7 being the charging end from which the glass travels longitudinally to the discharge end (not shown).

A series of longitudinal flues 8 and 9 and 10 are provided underneath the muffled chamber 5 and these flues communicate through passages 11, 12 and 13 with a common exhaust flue 14 which is provided with an exhaust fan diagrammatically shown at 15. The passages 11, 12 and 13 are provided with dampers 16, 16a and 16b. The end passage 8a of the flue 8 is provided with a damper 19 and the exhaust flue 14 is also provided with a damper 20. The flues 9 and 10 are provided with passages 17 having dampers 21, Fig. 2, to control the air passing into the flues or chambers 9 and 10.

As shown in Fig. 2, the flues 8, 9 and 10 are disposed centrally of the leer chamber and a series of side flues 23 similar to the center flues and discharging through similar damper regulated passages into their common exhaust flues are provided. The flues 23 are provided with burner ports 24 to constitute heating flues adjacent the central cooling flue. The exhaust flues for the side flues 23 are provided with damper controlled exhaust means similar to the damper 20 and fan 15 of the center exhaust flue 14.

By manipulating the dampers 19 and 16 of the flue 8 the desired quantity of cooling air may be drawn through the flue 8, the passage 11 and exhaust passage 14, by operation of the exhaust fan 15. The draft may be further controlled by manipulating the damper 20. Similarly, cool air may be drawn through passages 17 and 18 into the independent cooling flues 9 and 10, the volume and rate of flow being controlled by dampers 21, 16, 16a and 16b. Any number of such flues as the flues 9 and 10 may be employed and connected to a common exhaust flue such as the flue 14, and with the manipulation of the dampers 20, 19, 21 and 16, 16a, 16b, etc., any desired temperature control and condition may be obtained throughout the annealing range of the glass sheet.

Although the invention has been described as embodying side heating flues, it will be obvious to those skilled in the art that the side flues are ordinarily to be used only for preheating the leer structure after a shut-down and preparatory to placing it in service as an annealing means. Any or all of said side flues might also be heated if for any reason the heat in-put to the leer hearth from the glass is so great that the center flue muffles cannot be kept relatively cool enough to provide for equal transverse radiation from the glass sheet to the hearth of the leer even with all center flue dampers and fan or exhaust damper wide open. The heat in this case would be applied to as many side flue sections as necessary to retard radiation from the glass to the muffle tile. By keeping cooling air flowing through the center flues and by the application of heat to the side flues, the rate of radiation to the leer hearth transversely of the glass sheet can be controlled and equalized.

It will also be observed that the common exhaust means herein described is solely for the purpose of producing the necessary flow of gases through the flues for the purpose of and to the end described above and that such flues and exhaust have no other function than as described. They may preferably not be exposed to direct radiation from the hot glass and hence cannot be considered as essential parts of the control system.

It is also evident that although the invention has been described as applicable to the annealing of sheet glass on account of the transverse thermal balance control, it may be advantageously employed in leer structures for the annealing of glassware such as bottles or the like.

Although one embodiment of the invention has been herein illustrated and described, it will be obvious to those skilled in the art that various modifications may be made in the details of construction without departing from the principles herein set forth.

I claim:

1. In a glass annealing leer, an annealing chamber, a plurality of horizontal flues in longitudinally spaced relation associated with one wall of said chamber, means for independently establishing communication of the several flues with the atmosphere and a common exhaust means for all of said flues, said exhaust means not being exposed to heat radiation from the glass.

2. In a glass annealing leer, an enclosing wall structure forming an annealing chamber, means for conveying material through said chamber, a plurality of separate horizontal flues in longitudinally spaced relation adjacent one wall of said chamber, said flues having individual controllable inlet openings communicating with the atmosphere, and controllable outlet openings, and means for causing a flow of air through each of said flues unadulterated by air or gases from the other flues.

3. In a glass annealing leer, an enclosing wall structure forming an annealing chamber, said chamber having a relatively thin bottom wall, a plurality of horizontal flues in longitudinally spaced relation associated with said bottom wall and having individual openings communicating with the atmosphere, exhaust means for said flues, means for independently regulating the flow of air through the several flues and means for controlling the flow of air simultaneously through all of said flues.

In testimony whereof I have hereunto set my hand this 30th day of February, 1930.

HENRY D. PAXTON.